CHARLES J. ARLINGTON.
Harvester Rake.
No. 79,539. Patented July 7, 1868.
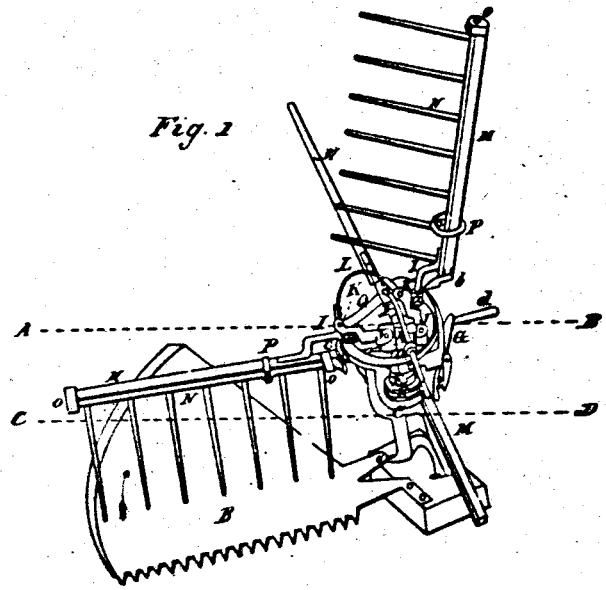
Fig. 1
Fig. 2 - is a vertical Section between A & C of Fig. 1
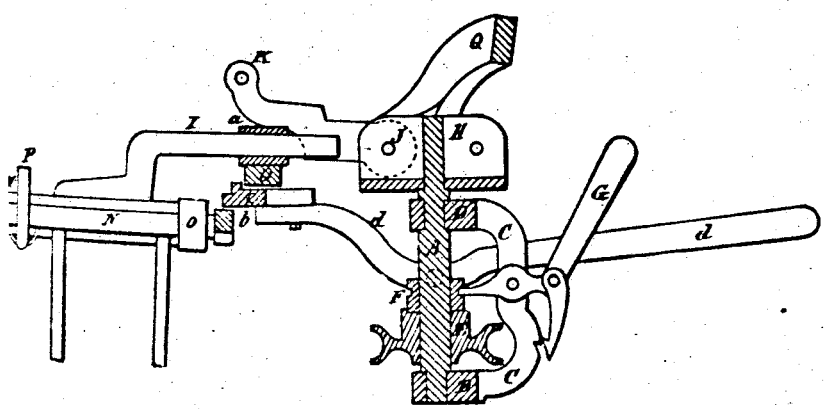
Witnesses. Inventor.

United States Patent Office.

CHARLES J. ARLINGTON, OF AUBURN, NEW YORK, ASSIGNOR TO C. WHEELER, JR.

Letters Patent No. 79,539, dated July 7, 1868.

IMPROVEMENT IN HARVESTER-RAKES.

The Schedule referred to in these Letters Patent and making part of the same.

TO ALL WHOM IT MAY CONCERN:

Be it known that I, CHARLES J. ARLINGTON, of the city of Auburn, county of Cayuga, and State of New York, have invented certain new and useful Improvements in "Combined Rakes and Reels for Harvesters;" and I do hereby declare that the following is a full, clear, and exact description thereof, reference being had to the accompanying drawings, and to the letters of reference marked thereon, forming part of this specification.

To enable others skilled in the art to make and use my invention, I will now describe the same.

Figure 1 of the drawings represents the "combined rake and reel" in perspective, as applied to the platform and cutting-apparatus of a harvester.

Figure 2 is a vertical section of the same between A C of fig. 1, passing through the vertical spindle or axis on which the wings of the reel are mounted.

The same letters, where they appear, indicate corresponding parts in all the figures.

The nature of the invention consists in so combining a rake or rakes, with a reel, that the teeth of the rake may be brought into a vertical position as they pass the platform, for the purpose of removing the cut grain in gavels for binding, at the pleasure of the driver.

The spindle or shaft A is supported in a position nearly vertical to the plane of the platform B, by a frame, C, having suitable bearings D, in which the spindle A is free to turn.

Between the bearings D, on the spindle A, is loosely placed driving-pulley E, by which motion is imparted to the spindle A by a chain or band connecting with the moving parts of the machine.

A clutch, F, operated by the lever G, serves to connect the pulley E to or disconnect it from the spindle A, at pleasure. Affixed to the top of spindle A is a head or ear-piece, H, to which arms I are hinged at J. The arms I have near their middle, on their upper sides, ears K, to which are hinged the springs L. The arms I at their outer ends are fastened to the reel-wings M. To two of the reel-wings are fastened rakes N, having bearings O, in which they are free to rock or turn.

To the rakes N is hinged one end of a spring, P, the other end being fastened to the wings M.

The arms I, have each a friction-roller, a, placed on them. These friction-rollers travel on the irregular circular track or rail Q, which rail is fastened on top of and supported by the frame C.

To the inner ends of the rakes are fastened elbow-pieces b, which are at right angles to the teeth of the rake.

To the frame C is hinged a plate, c, which is free to vibrate under the track-piece Q, and may be brought up to it at pleasure, by means of the lever d. This vibrating-plate c is made in the arc of a circle, and of larger outside diameter and less inside diameter than the track Q under which it vibrates.

In operation, the wings of the reel are moved across the platform B, in the direction of the arrow, the arms I, which carry the wings M, being connected together in pairs, by the springs L are kept down to the track Q, and follow closely its surface, which, on that side next to the platform, is parallel to it, and on the other side nearly vertical, the rollers a relieving the arms I from undue friction. The wings M revolve over the platform, parallel to it, and at sufficient distance above not to disturb the fallen grain.

As the wings pass the rear of the platform, they rise to a vertical position, and pass forward, where they are depressed, and dip into the standing grain, and bring it back to the cutters, where it is severed, and falls upon the platform. When a sufficient quantity has collected on the platform for a sheaf, the driver, by means of the lever d, brings the plate c up under the rail Q, and, as the reel-wings M, carrying rakes N, reach the front of the platform, the elbow-piece b strikes the plate c, and the rake-head N is turned in its bearings, so as to rock or turn the teeth down to a vertical position, in which position the lower ends of the teeth travel close to the surface of the platform, and remove the grain to the ground at the other side of the platform.

As the rake delivers the grain, the elbow b passes out from under the plate c, and the recoil of the spring D rocks the rake-teeth back to a position parallel to the surface of the platform, in which position they pass over it at all times during the process of reeling down the grain.

By raising the plate c up, and keeping it in contact with the under side of rail Q, the rakes will each be operated, as they pass over the platform, and will sweep the accumulated grain off twice to each revolution of the reel.

By removing one of the rakes, and fastening the plate c, as described, the grain will be swept from the platform but once at each revolution.

It will thus be seen that by this arrangement, the operator can control the size of the bundles, by delivering the grain from the platform at pleasure, which is an advantage where the crop to be cut varies in stoutness in different parts of the same field. He can also, where the crop is stout and uniform, deliver the grain at uniform distances, by keeping plate c to track Q, and where uniform but thin on the ground, by removing one rake, and operating in the same way, uniformity of distance in delivery and sufficient size of bundles may be obtained.

By rocking back the rake-teeth, in the manner described, they not only pass over the platform without disturbing the fallen grain, but they do not interfere with the winge M in the process of reeling down the grain. When elevated to a vertical position, in passing from the delivery to the front or cutting-side of the platform, the teeth of the rakes being turned back, less space is required, and the driver has more room on the machine.

What I claim as my invention, and desire to secure by Letters Patent, is—

In a combined "reel-rake," the arms of which are hinged to a head, moving around an axis nearly perpendicular to the platform, the rake-heads so hinged to their arms, and combined with springs, that their teeth shall be retained in a position nearly parallel to the platform in reeling, in combination with mechanism under the control of the operator, so that he can bring their teeth to a vertical position at pleasure, for the purpose of raking, substantially as described.

Also, the combination, substantially as described, of a continuous fixed cam-way, for guiding the rake and reel-arms, and a second movable cam, which, when raised by the attendant, forms a guide-way outside the first track, for controlling the rakes.

Also, the spring L, in combination with the arms I, for the purpose of keeping the wings M in proper working position, substantially as described.

Also, the spring P, as combined with the rake N and wing M, for the purpose of keeping the rake out of the way of the grain in the process of reeling, substantially as described.

CHARLES J. ARLINGTON.

Witnesses:
 SAMUEL D. WILLARD,
 CHAS. L. WHEATON, Jr.